(12) United States Patent
Arend et al.

(10) Patent No.: US 10,824,590 B2
(45) Date of Patent: Nov. 3, 2020

(54) FAILURE TOLERANT DATA STORAGE ACCESS UNIT, FAILURE TOLERANT DATA STORAGE ACCESS SYSTEM AND METHOD FOR ACCESSING A DATA STORAGE

(71) Applicant: Rohde & Schwarz GmbH & Co. KG, Munich (DE)

(72) Inventors: Michael Arend, Hessisch Oldendorf (DE); Felix Bartelt, Hambuehren (DE); Dirk Thometzek, Hamburg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 109 days.

(21) Appl. No.: 15/835,208

(22) Filed: Dec. 7, 2017

(65) Prior Publication Data

US 2019/0179920 A1    Jun. 13, 2019

(51) Int. Cl.
*G06F 7/00*     (2006.01)
*G06F 16/13*    (2019.01)
*G06F 11/20*    (2006.01)
*G06F 16/17*    (2019.01)
*G06F 11/07*    (2006.01)

(52) U.S. Cl.
CPC .......... *G06F 16/13* (2019.01); *G06F 11/0727* (2013.01); *G06F 11/0745* (2013.01); *G06F 11/2056* (2013.01); *G06F 11/2058* (2013.01); *G06F 11/2071* (2013.01); *G06F 16/17* (2019.01)

(58) Field of Classification Search
CPC ...... G06F 16/13; G06F 16/17; G06F 11/0727; G06F 11/0745; G06F 11/2056; G06F 11/2058; G06F 11/2071
USPC .................................................. 707/600–899
See application file for complete search history.

(56) References Cited

U.S. PATENT DOCUMENTS

| | | | |
|---|---|---|---|
| 5,513,314 A | 4/1996 | Kandasamy et al. | |
| 6,834,326 B1 | 12/2004 | Wang et al. | |
| 7,389,393 B1 | 6/2008 | Karr et al. | |
| 2005/0086427 A1* | 4/2005 | Fozard | G06F 3/0626 711/111 |
| 2005/0257082 A1 | 11/2005 | Zohar et al. | |
| 2018/0189176 A1* | 7/2018 | Jobi | G06F 9/5022 |

* cited by examiner

*Primary Examiner* — Isaac M Woo
(74) *Attorney, Agent, or Firm* — Christensen O'Connor Johnson Kindness PLLC

(57) ABSTRACT

A failure tolerant data storage access unit with real time capability comprising at least two data volumes and a file requesting handler that handles a file operation request from an application. The file requesting handler is configured to multiply the file operation request at least twice and to forward the multiplied file operation requests to the at least two data volumes ensuring simultaneous and independent processing of the multiplied file operation requests. Further, a failure tolerant data storage access system with real time capability and a method for accessing a data storage are described.

17 Claims, 3 Drawing Sheets

FAILURE TOLERANT DATA STORAGE ACCESS UNIT, FAILURE TOLERANT DATA STORAGE ACCESS SYSTEM AND METHOD FOR ACCESSING A DATA STORAGE

FIELD OF THE DISCLOSURE

Embodiments of the present disclosure relate generally to a failure tolerant data storage access unit with real time capability as well as a failure tolerant data storage access system with real time capability. Further, embodiments of the present disclosure also relate generally to a method for accessing a data storage in a failure tolerant manner.

BACKGROUND

In the state of the art, systems for accessing data, for instance video and/or audio data, are known that comprise a data storage unit being redundant in order to ensure that data failures during the accessing can be compensated appropriately. Typically, the data storage units used by the systems of the state of the art comprise a redundant array of independent disks system (RAID system) wherein the data to be accessed is mirrored on at least two separately formed disks (RAID 1).

In case of a problem with the data access, the system performs a failover handling from a first storage unit to a second storage unit of the RAID system in order to ensure that the data required can be accessed appropriately by the system. However, a delay in the data stream (data access) occurs due to the fact that a response of the respective data storage unit has to be awaited prior to the failover handling. In fact, the systems of the prior art interrupt the data accessing in case of an error and send a feedback to the application that requests accessing the data, in particular by providing a reading request or a writing request.

Accordingly, the systems known in the state of the art are not enabled to ensure a data access without interruption in case of an error, namely a non-blocking data access.

SUMMARY

Accordingly, there is a need for a possibility to provide data access with real time capability in an easy and cost-efficient manner.

Embodiments of the present disclosure provide a failure tolerant data storage access unit with real time capability, the unit comprising at least two data volumes and a file requesting handler that handles a file operation request from an application, the file requesting handler being configured to multiply the file operation request at least twice and to forward the multiplied file operation requests to the at least two data volumes ensuring simultaneous and independent processing of the multiplied file operation requests.

Further, embodiments of the present disclosure provide a method for accessing a data storage in a failure tolerant manner by using a failure tolerant data storage access system, with the following steps:
requesting a file operation via an application;
processing the file operation via a file requesting handler;
multiplying the file operation request at least twice;
forwarding the multiplied file operation requests to at least two data volumes; and
processing the multiplied file operation requests simultaneously and independently from each other.

Accordingly, the embodiments of the present disclosure ensure that the at least two data volumes are requested simultaneously. The single file operation request of the application handled by the file requesting handler is at least duplicated and forwarded to the two data volumes by the file requesting handler. This ensures that the desired data is transmitted from both data volumes to the file requesting handler substantially simultaneously which awaits the data requested by the application. The file requesting handler forwards the data to the application such that the application has access to the data requested.

The file requesting handler ensures that the data requested is forwarded to the application only once even though the data may be forwarded to the file requesting handler at least twice. This ensures that a continuous data stream is provided.

As the file requesting handler forwards the file operation request to the at least two data volumes simultaneously, a delay of data stream in case of an error does not occur such that a real time capability is ensured which means that an occurring interruption is less than one second, in particular that no interruption at all occurs. In fact, the interruption only depends on the used hardware as the data stream itself does not have any interruption due to the multiplied file operation requests processed simultaneously that are forwarded to the data volumes via the file requesting handler.

The file operation request may be a so called input/output request (I/O request).

According to an aspect, the file operation request is a read request or a write request. Therefore, the file operation request issued by the application and handled by the file requesting handler may correspond to a data access in order to read data stored in the at least two data volumes or to access the data volumes in order to write data.

In general, the data may be all kind of data, and in some embodiments, audio and/or video data.

Another aspect provides that the file requesting handler is configured to return the first successful response of one of the at least two data volumes to the application. This ensures that a continuous data stream is provided in real time as the data forwarded to the file requesting handler is forwarded immediately to the application after receipt by the file requesting handler. Thus, no delay occurs while accessing the data.

According to an embodiment, the file requesting handler is configured to discard the at least one response that arrives later in case of a read request. This means that the file requesting handler ensures that the data from the at least two data volumes is forwarded to the application only once ensuring a continuous data stream. Thus, the same data is not forwarded to the application twice or more often as the later arriving responses are discarded. In other words, the file requesting handler ensures that the later arriving response is disregarded from further processing.

Further, the file requesting handler may be configured to analyze the at least one response that arrives later in case of a write request in order to verify if the associated write operation was successful. The file requesting handler ensures that write operations have been performed on all data volumes successfully in order to ensure that the data provided by the at least two separated data volumes correspond to each other.

Another aspect provides that at least one error handling member is provided that is configured to output an error message in case of an unsuccessful file operation request. The unsuccessful file operation request may be a read request which was not successfully performed by one of the at least two data volumes. The error message is used to fix the problem related to the unsuccessful file operation request. In general, the first arriving successful response is forwarded to the application such that the continuous data stream is ensured. Therefore, the error message is not sent to the application itself as the continuous data stream is still available. In the prior art, the error message was forwarded to the application which has to send a feedback which in turn leads to the delay in the data processing or rather data accessing. Such a message is masked by the current unit.

The error message may be forwarded to a central management unit that is connected to the failure tolerant data storage access unit. The central management unit may be connected to several failure tolerant data storage access units of a failure tolerant data storage access system.

The error-handling member may be connected with a network communication interface for transmitting the error message.

According to an embodiment, the file requesting handler comprises the at least one error-handling member. The error-handling member is integrated in the file requesting handler that analyzes the data provided by the at least two data volumes. Thus, the same instance analyses the data and reports an error in case of its occurrence.

Moreover, a data processing member may be provided that is configured to manipulate the data processed, in particular to rectify the data and/or to convert the data. For instance, the data may be rectified and/or converted within the data processing member which depends on the analyzing step done by the file requesting handler and the file operation request of the application, respectively.

Thus, the data processing member may correspond to a quality control instance as the data provided may be rectified in case of an error identified.

Furthermore, the data may be converted or rather transcoded between different formats depending on the file operation request from the application and the format of the data. For instance, data provided in a MP4 format may be converted to a JPEG 2000 format or a 4K video format is converted into two different lower resolution proxies for further processing.

Another aspect provides that a virtualization layer is provided, the virtualization layer comprising at least one of the file requesting handler and the at least one error handling member. Accordingly, the failure tolerant data storage access unit may be provided by a unit being part of a Virtual File System (VFS). The file requesting handler processes the file operation request provided by the application virtually when multiplying the file operation request of the application into multiple real file operations that access the data appropriately.

In some embodiments, the failure tolerant data storage access unit is established by the virtualization layer. Therefore, the data volumes themselves may be virtual data volumes, namely mounted data volumes. Therefore, the data may be located on remote data storage devices which are accessed via the (virtual) mountings that are assigned to the data volumes.

In general, the physical sector level of a physical data storage device, for instance a hard disk, is not mirrored by the failure tolerant data storage access unit, but the inherent structure of the used file system and its application. In case of a video data stream, single frames of the video are requested and transferred instead of sectors of the physical file system itself such as FAT, ext4 or similar systems.

At least one of the at least two data volumes is a data sink or a data source. As mentioned above, the file operation request may be a read request or a write request. Depending on the kind of file operation request, the data volumes are used as a data sink or a data source.

The file requesting handler may be configured to handle at least two file operation requests simultaneously, in particular a write request and a read request. For instance, the file requesting handler is configured to handle two or more write requests or two or more read requests simultaneously. Further, read requests and write requests may be handled simultaneously. Therefore, data exchange is improved in general. For instance, two or more applications may access the data provided by the data volumes simultaneously wherein these application may access the data for writing and/or reading.

Moreover, embodiments of the present disclosure provide a failure tolerant data storage access system comprising several failure tolerant data storage access units as described above. Scalability of the data access is achieved by using several units.

Furthermore, at least one central management unit may be provided that is connected with the several failure tolerant data storage access units. Particularly, the central management unit is connected with the file requesting handler of each failure tolerant data storage access unit. Accordingly, the outputs of the analyses and/or the error messages of the several units may be exchanged with the central management unit for managing the whole system, for instance the data provided by the data volumes.

The central management unit may be configured to (re-)synchronize the data in case of an error message indicating an unsuccessful file operation request.

The system may comprise at least two physical data storage devices which are assigned to the at least two data volumes. As mentioned above, the data volumes may be mounted volumes of the physical data storage devices which are located remotely. The at least two physical data storage devices may be established by a RAID 1 system.

Generally, the data volumes may correspond to mounted drives (mount points), a network share, a network drive, a network accessing system or any other suitable system enabling access to data.

Further, the data volumes ensure that the data can be accessed by each application, in particular by third parties via standard file input/output connections.

In some embodiments, the at least two data storage devices are interconnected with each other via at least one connecting member in order to ensure a data exchange between the at least two data storage devices. The at least one connecting member may be an interne protocol cable (IP cable) or a fiber channel. Therefore, it is ensured that the two data storage devices may be located remotely with respect to each other. Furthermore, this allows usage of all kind of industrial standard solutions as there is no restriction to proprietary solutions.

The failure tolerant data storage access system is independent with regard to the units and devices used such that different file systems can be used, not only proprietary ones.

According to an aspect, the first successful response of one of the at least two data volumes is returned to the application via the file requesting handler. A continuous data stream is provided in real time without any delay.

Further, in case of a read request, the at least one response that arrives later may be discarded by the file requesting handler. This ensures that the data requested is forwarded to the application only once such that a continuous data stream is provided.

Moreover, in case of a write request, the at least one response that arrives later may be analyzed by the file requesting handler. The data volumes are maintained in a mirrored state with regard to the data as an error would be identified during the analyzing step.

The data processed may be at least one of converted and rectified. Accordingly, the data requested is forwarded to the application in the requested format as it is converted. In addition, errors or failures may be rectified.

In general, read and write operations may be handled simultaneously. In some embodiments, the file requesting handler of each unit may be configured to process read and write requests simultaneously.

Two or more applications may access the data provided by the data volumes simultaneously.

Furthermore, an error message may be forwarded to all failure tolerant data storage access units embedded in the failure tolerant data storage access system. This can be done by a central management unit that journals all error notifications received. Further, the processing of the error message by the central management unit ensures that erroneous data is not used by the other units.

In general, the failure tolerant data storage access system may comprise at least two central management units and/or the at least two physical data storage devices at least twice in order to ensure redundancy of the whole system, in particular of the data to be accessed.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
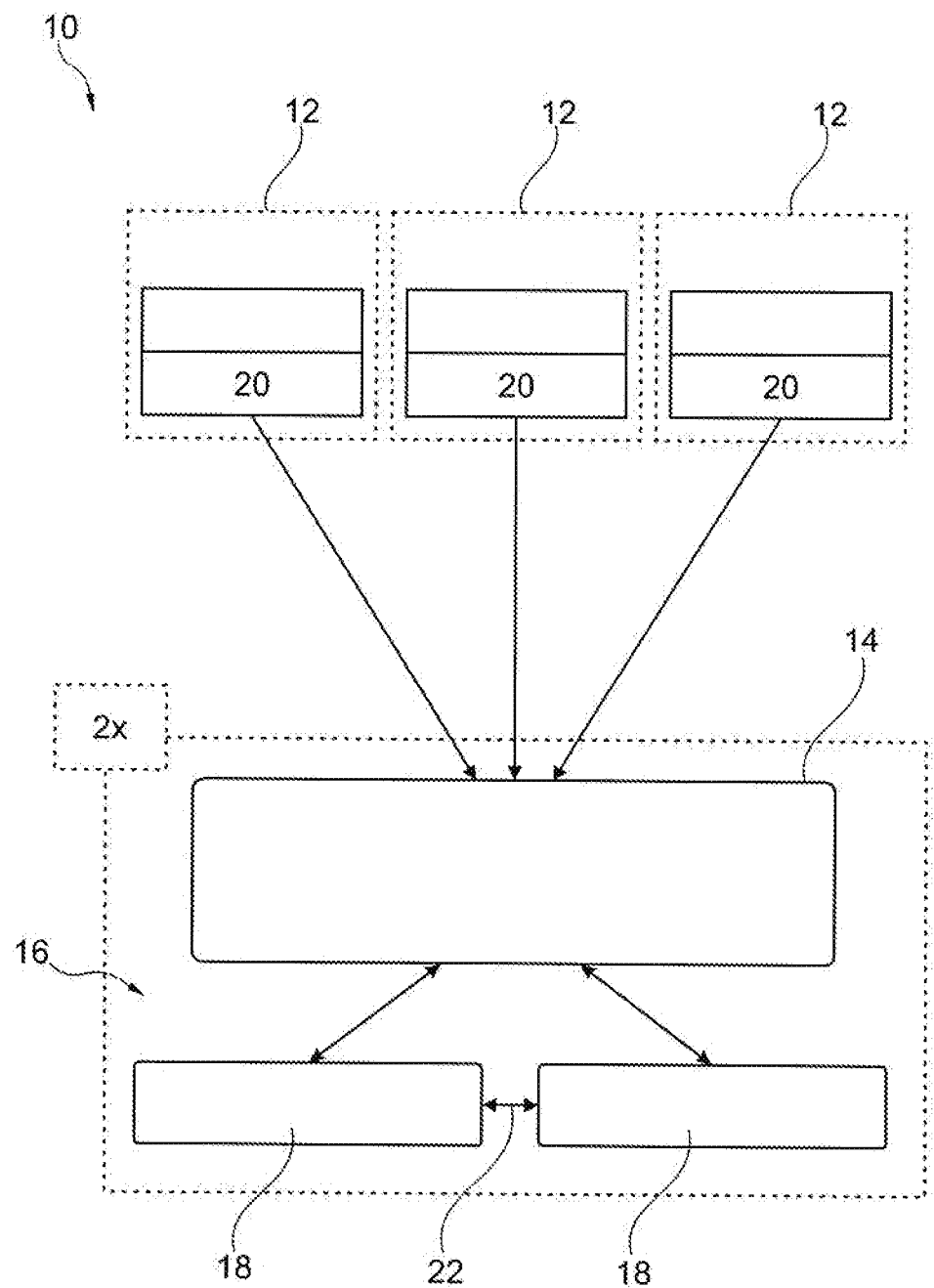
FIG. 1 shows a schematic overview of one representative embodiment of a failure tolerant data storage access system according to the present disclosure.

In FIG. 1, a failure tolerant data storage access system 10 is shown that comprises, for example, a number of failure tolerant data storage access units 12, a central management unit 14 as well as a data storage access system 16 that comprises at least two physical data storage devices 18. The central management unit 14 is configured to exchange data with the several failure tolerant data storage access units 12 as well as the data storage access system 16, in particular the at least two physical data storage devices 18.

In the shown embodiment, the failure tolerant data storage access system 10 comprises three different failure tolerant data storage access units 12 each comprising a network communication interface 20 which are configured to communicate with the central management unit 14 as will be described later.

As indicated in FIG. 1 by the labeling "2x", the failure tolerant data storage access system 10 may comprise the central management unit 14 as well as a data storage access system 16 at least twice in order to ensure a redundancy of the data and the central management unit 14 for improving the failure tolerance of the whole system 10.

Generally, the physical data storage devices 18 of the data storage access system 16 may be interconnected with each other in order to ensure a data exchange between the at least two data storage devices 18. For instance, the data storage devices 18 may be connected via a connecting member 22 that may be established by an internet protocol cable (IP cable) or a fiber channel. The data storage devices 18 can be located remotely with respect to each other.

Figure 2:
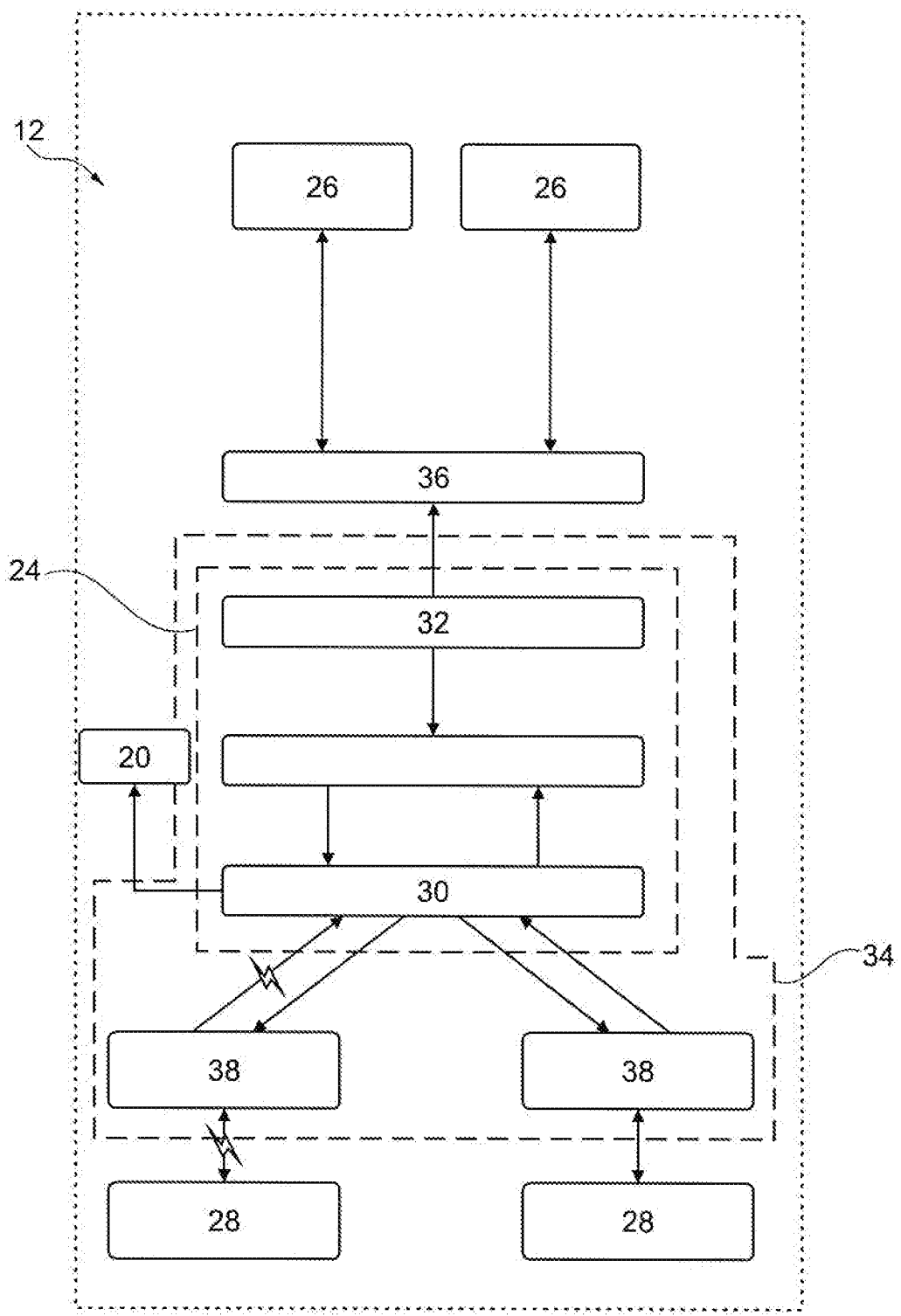
FIG. 2 shows a schematic overview of one representative embodiment of a failure tolerant data storage access unit according to the present disclosure.

In FIG. 2, a failure tolerant data storage access unit 12 that can be used in the system 10 shown in FIG. 1 is illustrated in more detail. Each failure tolerant data storage access unit 12 comprises a file requesting handler 24 that interacts with at least one application 26, for instance an application running on a playout server. Accordingly, the application 26 provides file operation requests that are handled by the file requesting handler 24. The file operation requests may be a read request or a write request that requires data access to the data storage access system 16, in particular the data stored on the two physical data storage devices 18 of the system 10 shown in FIG. 1.

The failure tolerant data storage access unit 12, in particular the file requesting handler 24, ensures that the data stored on the physical data storage devices 18 are provided to the application 26 in real time without any delay.

For this purpose, the file requesting handler 24 multiplies the file operation request of the application 26 at least twice and forwards the multiplied file operation requests to at least two data volumes 28 that are assigned to the two physical data storage devices 18. Accordingly, the file requesting handler 24 ensures a simultaneous and independent processing of the multiplied file operation requests as they are forwarded to the data volumes 28 simultaneously and independently of each other.

The data volumes 28 are assigned to the data storage devices 18 as the data volumes 28 may be mounted data volumes of the physical data storage devices 18 that are located remotely. In general, the data volumes 28 may correspond to mounted drives (mount points), a network share, a network drive, a network accessing system or any other suitable system enabling access to data.

The file requesting handler 24 may also multiply the file operation request from the application 26 three times or four times depending on the number of different physical data storage devices 18 provided by the data storage access system 16. Usually, the multiplying factor of the file operation request from the application 26 corresponds to the number of different physical data storage devices 18 used by the data storage access system 16.

The data volumes 28 receiving the multiplied file operation requests processes the requests simultaneously and independently of each other wherein the respective responses are forwarded to the file requesting handler 24 for further processing. The file requesting handler 24 processes the responses depending on their time of arrival differently as the first successful response of one of the at least two data volumes 28 is forwarded to the application 26 in order to ensure a continuous data stream without any delay.

Provided that the other data volume 28 will also provide a (successful) response to the file requesting handler 24 which may arrive later, the file requesting handler 24 discards the response that arrives later in order to ensure that the application 26 receives each data (package) only once. In some embodiments, the file requesting handler 24 discards the response that arrives later only in case of a read request provided by the application 26.

In case of a write request of the application 26 that was multiplied by the file requesting handler 24 previously, the file requesting handler 24 analyzes the response that arrives later in order to verify if the write operation associated to the write request was successful for each different data volume 28.

This is important in order to ensure that the different data volumes 28, in particular the physical data storage devices 18 assigned to the different data volumes 28, are synchronized appropriately such that the same data is provided on the physical data storage devices 18 after a write request has been performed.

Moreover, the failure tolerant data storage access unit 12, in particular the file requesting handler 24, comprises at least one error handling member 30 which outputs an error message in case of an unsuccessful file operation request. For instance, a read request being multiplied by file requesting handler 24 was not successfully performed by one of the different data volumes 28, in particular the left data volume 28 as indicated by the flash icon.

As mentioned above, the continuous data stream is ensured in real time as the first successful response arriving at the file requesting handler 24 is forwarded to the application 26, namely the response of the right data volume 28 in FIG. 2. Accordingly, the failure tolerant data storage access unit 12 ensures that no error message is forwarded to the application 26 itself as the continuous data stream is still provided due to the multiplied requests forwarded to the data volumes 28 simultaneously.

However, the error message may be forwarded via the network communication interface 20 to the central management unit 14 in order to fix the problem, for instance in case of no response (e.g., out of time).

In case of a write request being unsuccessful, which is identified by an analyzing step, the failure tolerant data storage access unit 12, in particular the at least one error handling member 30, outputs an error message via the network communication interface 20 which is forwarded to the central management unit 14 for further processing.

However, the error message is not sent to the application 26 itself as the continuous data stream is ensured due to the multiplying of the file operation request of the application 26 previously. Therefore, the user of the application 26 does not become aware of any problem with regard to the file system as this is handled by the system 10 internally.

The central management unit 14 being an active or passive management unit journals all error messages or notifications in order to (re-)synchronize the data provided by the at least two different physical data storage devices 18. Accordingly, the central management unit 14 ensures that the storage redundancy is restored appropriately for further processing. Further, the central management unit 14 may prevent the other failure tolerant data storage access units 12 to use erroneous data related to the unsuccessful write operation.

Generally, the failure tolerant data storage access unit 12, in particular the file requesting handler 24, comprises a data processing member 32 that manipulates the data processed. Thus, the failure tolerant data storage access unit 12 may manipulate the data that is forwarded to the application 26. For instance, the data may be rectified in case of an error detected during the processing of the data stream. Thus, the failure tolerant data storage access unit 12 has an integrated quality control instance.

Furthermore, the data processing member 32 may convert the data into a format that is requested by the application 26. Thus, a format conversion of the data may be done by the failure tolerant data storage access unit 12, for instance converting a MP4 format into JPEG 2000 or a 4K video into two different lower resolution proxies.

In general, the failure tolerant data storage access unit 12 may comprise a virtualization layer 34 that comprises at least the file requesting handler 24 and the at least one error handling member 30 (which may be part of the file requesting handler 24). Thus, the main components of the failure tolerant data storage access unit 12 may be established by the virtualization layer 34 as indicated in FIG. 2.

In addition, the central management unit 14 may also be part of the virtualization layer 34 such that the virtualization layer 34 comprises the main components of the failure tolerant data storage access system 10, apart from the physical data storage devices 18.

The failure tolerant data storage access unit 12 may provide a mounting point 36 for at least a part of a virtual file system wherein the mounting point 36 corresponds to an interface of the applications(s) 26 and the virtualization layer 34.

Thus, the failure tolerant data storage access unit 12 may appear as a drive letter due to the mounting point 36. Hence, the failure tolerant data storage access unit 12 may comprise a software module ensuring the functionality mentioned above.

In some embodiments, the failure tolerant data storage access unit 12 may only interact with the physical data storage devices 18 via the mounting of these devices 18 in order to provide the (virtual) data volumes 28 accessed by the file requesting handler 24. Therefore, the virtualization layer 34 provides respective mounting interfaces 38.

In general, two or more applications 26 may run simultaneously such that read and write requests are handled simultaneously by the failure tolerant data storage access unit 12, in particular the file requesting handler 24.

Figure 3:
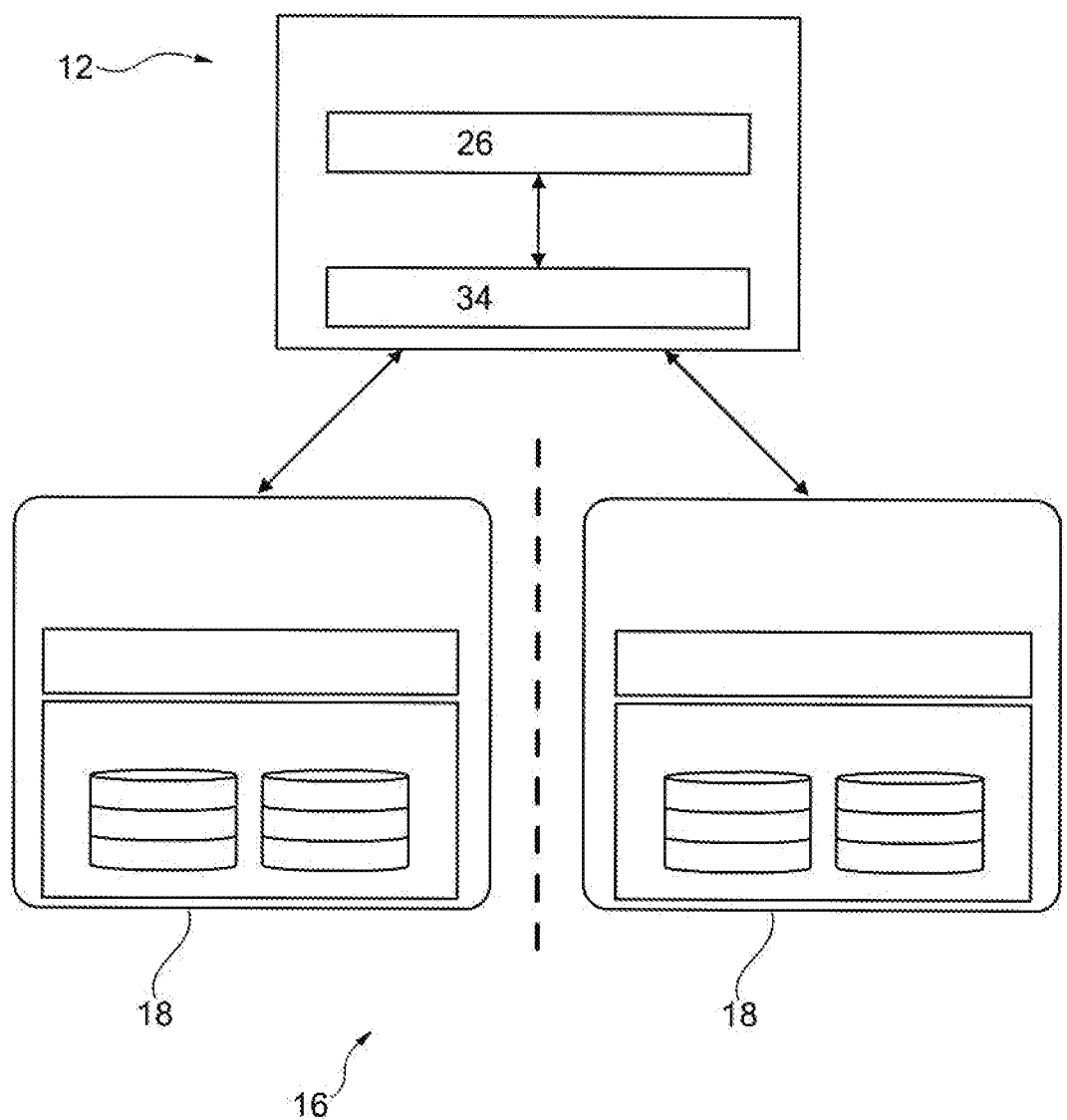
FIG. 3 shows a simplified schematic overview of the failure tolerant data storage access unit shown in FIG. 2.

As shown in FIG. 3, the different blocks of the virtualization layer 34 can be summarized appropriately. Hence, it becomes obvious that the virtualization layer 34, namely the failure tolerant data storage access unit 12 and the central management unit 14, interacts with the applications 26 and the physical data storage access system 16 which may be located remotely.

As indicated in FIG. 3, the virtualization layer 34, namely the file requesting handler 24, ensures that the at least two physical data storage devices 18 are accessed simultaneously or rather ensuring the data stream to be transmitted without any delay even though a failure occurs during the data transmission.

The failure tolerant data storage access system 10 may correspond to at least one playout server wherein the failure tolerant data storage access unit 12 is started as a part of a virtual file system, namely the virtualization layer 34 which is mounted via the mounting point 36.

In general, the failure tolerant data storage access unit 12 will only notify about problems wherein these problems have to be fixed by the central management unit 14. Moreover, the failure tolerant data storage access unit 12 can only handle timing errors, but no data integrity errors. In other words, the timing errors may relate to data being not available or being forwarded too slow. However, the data integrity errors may be fixed by the central management unit 14 when (re-)synchronizing the data provided by the physical data storage devices 18.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A failure tolerant data storage access unit with real time capability, said unit comprising:
    at least two data volumes and a file requesting handler that handles a file operation request from an application, said file requesting handler being configured to multiply said file operation request at least twice and to forward said multiplied file operation requests to said at least two data volumes ensuring simultaneous and independent processing of said multiplied file operation requests in order to reduce or prevent a delay of data stream in case of an error of one data volume, wherein said file requesting handler is configured to return the first successful response of one of said at least two data volumes to said application, and wherein said file requesting handler is configured to discard the at least one response that arrives later in case of a read request.

2. The failure tolerant data storage access unit according to claim 1, wherein said file operation request is a read request or a write request.

3. The failure tolerant data storage access unit according to claim 1, wherein said file requesting handler is configured to analyze the at least one response that arrives later in case of a write request in order to verify if the associated write operation was successful.

4. The failure tolerant data storage access unit according to claim 1, wherein at least one error handling member is provided that is configured to output an error message in case of an unsuccessful file operation request.

5. The failure tolerant data storage access unit according to claim 4, wherein said file requesting handler comprises said at least one error-handling member.

6. The failure tolerant data storage access unit according to claim 1, wherein a data processing member is provided that is configured to manipulate the data processed, in particular to rectify the data and/or to convert the data.

7. The failure tolerant data storage access unit according to claim 1, wherein a virtualization layer is provided, said virtualization layer comprising at least one of said file requesting handler and said at least one error handling member, in particular wherein said failure tolerant data storage access unit is established by said virtualization layer.

8. The failure tolerant data storage access unit according to claim 1, wherein at least one of said at least two data volumes is a data sink or a data source.

9. The failure tolerant data storage access unit according to claim 1, wherein said file requesting handler is configured to handle at least two file operation requests simultaneously, in particular a write request and a read request.

10. A failure tolerant data storage access system with real time capability, comprising several failure tolerant data storage access units, each failure tolerant data storage access unit comprising at least two data volumes and a file requesting handler that handles a file operation request from an application, said file requesting handler being configured to multiply said file operation request at least twice and to forward said multiplied file operation requests to said at least two data volumes ensuring simultaneous and independent processing of said multiplied file operation requests in order to reduce or prevent a delay of data stream in case of an error of one data volume, wherein said file requesting handler is configured to return the first successful response of one of said at least two data volumes to said application, and wherein said file requesting handler is configured to discard the at least one response that arrives later in case of a read request.

11. The failure tolerant data storage access system according to claim 10, wherein at least one central management unit is provided that is connected with said several failure tolerant data storage access units, in particular wherein said central management unit is connected with said file requesting handler of each failure tolerant data storage access unit.

12. The failure tolerant data storage access system according to claim 10, wherein said system comprises at least two physical data storage devices which are assigned to said at least two data volumes.

13. The failure tolerant data storage access system according to claim 12, wherein said at least two data storage devices are interconnected with each other via at least one connecting member in order to ensure a data exchange between said at least two data storage devices, in particular wherein said at least one connecting member is at least one of an internet protocol cable and a fiber channel.

14. A method for accessing a data storage in a failure tolerant manner by using a failure tolerant data storage access system, with the following steps:
    requesting a file operation via an application;
    processing said file operation via a file requesting handler;
    multiplying said file operation request at least twice;
    forwarding said multiplied file operation requests to at least two data volumes; and
    processing said multiplied file operation requests simultaneously and independently from each other in order to reduce or prevent a delay of data stream in case of an error of one data volume,
    wherein the first successful response of one of said at least two data volumes is returned to said application via said file requesting handler,
    and wherein, in case of a read request, the at least one response that arrives later is discarded by said file requesting handler.

15. The method according to claim 14, wherein, in case of a write request, the at least one response that arrives later is analyzed by said file requesting handler.

16. The method according to claim 14, wherein read and write operations are handled simultaneously.

17. The method according to claim 14, wherein an error message is forwarded to all failure tolerant data storage access units embedded in said failure tolerant data storage access system.

* * * * *